Figure 1:
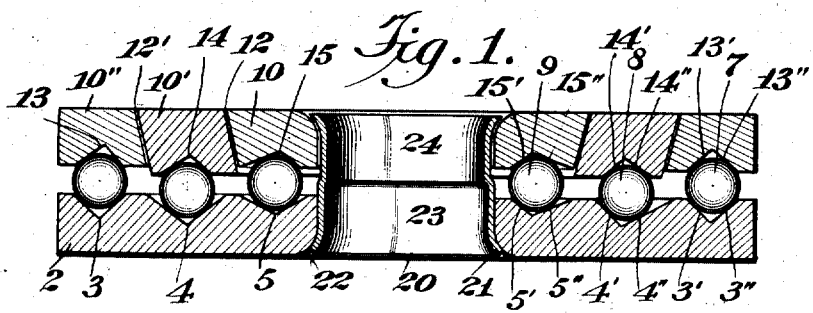

H. LA CASSE.
BALL BEARING.
APPLICATION FILED MAY 10, 1904. RENEWED JAN. 10, 1911.

1,000,612.  Patented Aug. 15, 1911.

UNITED STATES PATENT OFFICE.

HENRY LA CASSE, OF AUBURN, NEW YORK.

BALL-BEARING.

1,000,612.  Specification of Letters Patent.  Patented Aug. 15, 1911.

Application filed May 10, 1904, Serial No. 207,205. Renewed January 10, 1911. Serial No. 601,888.

*To all whom it may concern:*

Be it known that I, HENRY LA CASSE, a citizen of the United States, and resident of Auburn, in the county of Cayuga and State of New York, have invented certain new and useful Improvements in Ball-Bearings, of which the following is a specification.

This invention relates to improvements in ball bearings, and particularly to thrust bearings of that type in which the balls and their bearings are so combined as to permit the balls to revolve freely between the bearing surfaces with which they are in contact without having any sliding movement with respect to such surfaces.

My present invention relates more particularly to a multiple thrust bearing having a plurality of substantially concentric rows of balls which may roll in contact with bearing surfaces of the general character shown, described and claimed in Patent No. 518,321, granted to me April 17, 1894, although as to many of the features thereof my present invention is not limited to the type of bearing shown in said patent. In that patent there is illustrated an antifriction ball bearing having the general characteristics just mentioned, that is to say, a bearing in which the balls and the bearing surfaces are so combined that the balls revolve freely on such bearing surfaces without sliding. In my prior patent this result was accomplished by providing bearing surfaces which made contact with the balls in such a manner that each bearing point of each ball was in the surface of an imaginary cone having its vertex in the axis of the bearing, and I have shown this feature in the present case, and preferably retain the same as an important feature of my present improved thrust bearing.

One of the most important features of my present invention relates to the means which I employ to obtain a rolling movement of each one of the balls in a plurality of circuits of balls embodied in a multiple thrust bearing. In the manufacture of thrust bearings with two or more concentric rows of balls in one plane it has been found that it is extremely difficult to provide proper bearing surfaces for such balls in two opposing complementary members. This is due to the fact that the bearing surfaces or ball-races must first be machined out, then tempered, and afterward ground down to obtain a perfect bearing circuit for each row of balls. In performing these several operations there is always a slight difference in the results at each operation, and the aggregate of errors is such as to prevent proper coacting of all of the bearing surfaces with their respective rows of balls, and hence is such as to preclude the commercial manufacture of bearings of this type. I have found that such multiple thrust bearings can be formed with bearing surfaces which coact properly with a row of balls if one of such bearing members is made in sections each of which contains a single bearing surface or ball-race complementary to a corresponding bearing surface or ball-race of the opposing bearing member. One of the bearing members, usually the lower one, may be made in a single piece and a plurality of substantially concentric surfaces or ball-races formed therein by first machining out the metal at the face of the bearing member or plate and then tempering said bearing member and afterward grinding or otherwise shaping each bearing surface or ball-race separately to form a perfectly circular bearing surface. In thus finishing such a bearing member the bearing surfaces in some instances are so ground as to lie in slightly different planes, but each ball-race constitutes a perfect bearing surface for the balls of its own particular circuit. In order to obtain a perfect complementary bearing surface for each bearing surface thus formed, it is necessary to divide the complementary or opposing bearing member into a plurality of sections and to form in each section a bearing surface which is the complement of one already formed, and in forming such complementary bearing surface the depth to which the groove or race is ground is unimportant, as the necessary compensation for irregularities in depth may be readily made at the opposite or outer side of such section after the bearing surface has been completed. In this way each of the sections of the complementary bearing member may be shaped separately to form a desired bearing surface, and after all such surfaces have been finished the upper or outer faces of the sections may be brought to a common plane by grinding or otherwise, so as to assure the proper application of the load to all of the sections and the balls on which they rest.

Another important feature of my invention is the means I provide for constituting each multiple thrust bearing of the type just described a single element or unit. This I accomplish by providing a suitable retainer for holding in place the solid bearing member and one of the sections of the sectional bearing member, and by so shaping the various sections of the sectional bearing member that they are interlocked and can not become separated until the main ball-retainer is removed.

A further important feature of my invention is the means provided to distribute as uniformly as possible the loads borne by the different circuits of balls embodied in a thrust bearing of this type and to equalize the resistance opposed by the several circuits of the bearing faces to centrifugal force tending to force the balls out of their races.

Other features of my invention not hereinbefore referred to but which will be hereinafter described, are illustrated in the accompanying drawings, in which—

Figure 2:
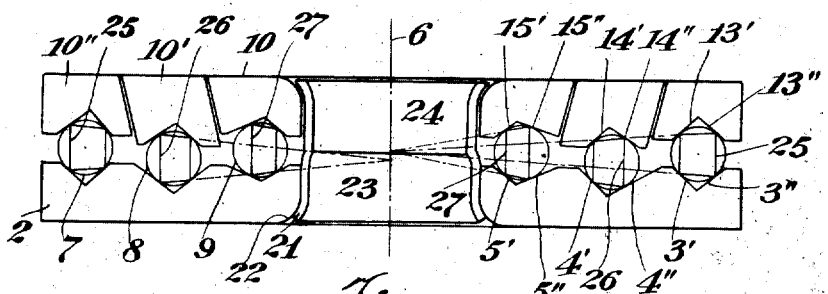

Figure 1 is a central vertical section of a multiple thrust bearing constructed in accordance with my present invention. Fig. 2 is a diagrammatic view of the same.

In carrying my present invention into effect, I prefer to make the lower or ball-supporting bearing member in one piece and to form therein a plurality of annular bearing surfaces, preferably in the form of grooves or ball-races capable of centering a plurality of circuits of balls and maintaining them in substantially concentric relation. Such a solid bearing member is shown at 2, and as shown it has three substantially concentric sets of bearing surfaces formed as grooves in the inner face of such bearing member. These grooves are designated generally by 3, 4 and 5. In constructing this bearing member these grooves are machined out as near as may be to the proper shape to receive the balls which are intended to roll therein, and after being so formed the bearing member is tempered to harden the bearing surfaces or ball-races. After being hardened each bearing surface is brought to the proper shape to permit each ball which makes contact therewith to roll thereon without sliding. This operation of finishing each bearing surface is usually accomplished by grinding such surface until it is perfectly true, each surface being of course finished or ground separately. When a bearing member is operated upon in this manner to form a plurality of substantially concentric ball-races or sets of bearing surfaces, it is usually found that there is a lack of uniformity even with such surfaces as are intended to be exactly alike, that is to say, placed at the same angle and the same depth. In the drawings, the aggregate error of the series of operations required to finish the bearing member is illustrated, and is exaggerated considerably for the sake of clearness.

5' and 5" indicate the two bearing surfaces of the ball-race 5 of small diameter formed in the bearing 2 and similar in construction to the bearing surfaces illustrated in my aforesaid patent. 4' and 4" illustrate another pair of bearing surfaces of larger diameter which in finishing have been ground to a slightly greater depth than the faces 5' and 5". The lines 3' and 3" indicate another pair of bearing surfaces which have been ground to a less depth than the surfaces 4' and 4". In all of these bearing surfaces, however, the balls which coact therewith make contact in such a manner that the bearing points of the balls are in the surfaces of imaginary cones the vertices of which are in the axis 6 of the bearing, as indicated by dotted lines in Fig. 2. The different rows of balls are designated respectively by 7, 8 and 9.

Instead of providing a single complementary or opposing bearing member to coact with that shown at 2, I have provided a sectional bearing member, the sections of that shown herein being three in number and being designated respectively by 10, 10' and 10". These three bearing members are all preferably annular and may be considered collectively as constituting a bearing member complementary to that shown at 2. This sectional bearing member is in fact a bearing member substantially similar to the solid one except that it is divided by narrow circular spaces, such as 12 and 12', which spaces separate the sections 10, 10' and 10" from one another and permit these sections to turn freely without making contact. These sections are provided with bearing surfaces complementary to those of the solid section, such surfaces being preferably formed by ball-races or grooves, such as 13, 14 and 15. The surfaces 13' and 13" correspond as to their angular positions with the surfaces 3' and 3", the surfaces 14' and 14" correspond to the faces 4' and 4", and the surfaces 15' and 15" correspond in angular positions to the surfaces 5' and 5". Each section of the upper bearing member, together with its bearing surfaces, is formed in substantially the same manner as the lower solid bearing member and any one of its ball-grooves, that is to say, such section is first properly shaped, then tempered, and its bearing surfaces afterward finished, as by grinding. The grinding operation leaves the different grooves and their bearing surfaces at different depths in the various sections 10, 10′ and 10″, as is determined in practically assembling the lower bearing member, the balls and the upper sectional bearing members substantially as shown in Fig. 1, when it is usually found that the upper sides of the respective sections 10, 10′ and 10″ are left at different heights as a result of the operations previously described. All of these sections are brought to a common plane after the ball-races have been finished, by assembling the parts in the manner just described and removing the highest portions or surfaces, as by grinding. When all of the upper surfaces have been thus brought to a uniform height and are in a common plane, as shown in the drawings, each section of the upper bearing member will sustain properly its own portion of the total load or thrust applied to the bearing. In all cases the bearing surfaces are preferably so formed as to require the minimum amount of grinding to finish the same.

In order to constitute the parts just described a single bearing element or unit, I provide in connection therewith ball-retaining means for holding all of the bearing elements and the balls securely in position. For holding the solid bearing member and the sectional bearing member together I make use of a ball-retainer, such as 20, of a type somewhat similar to that illustrated in my companion application, Serial No. 200,678, filed March 30, 1904, that is to say, I provide an internal retaining ring that is preferably formed from a section of soft steel tubing having its ends flared outwardly, as at 21, to coact with corresponding flaring walls 22 at the outer ends of the bores of the opposite bearing members and prevent undue endwise separation of the latter. This retaining ring 20 in the present case, however, instead of being formed of substantially one diameter and being loose with respect to both bearing members as in my aforesaid application, is formed of two diameters so as to have a fixed connection with one of the bearing members and be loose with respect to the other, the said retaining ring as herein shown being arranged with its end of largest diameter, indicated at 23, having a fixed connection with the lower bearing member 2 by means of frictional engagement therewith, and with its end of smallest diameter, indicated at 24, free from engagement with the section 10 of the upper bearing member so as to permit said section 10 to turn freely on the balls 7 without engaging the retaining ring. One of the advantages of this form of retaining ring is that it permits the coacting bearing members to be made of like diameter and form of bore while having fixed connection with one and being free of engagement with the other. The principal feature of my improved retaining means, however, relates to the manner in which the different sections of the upper bearing member are retained in their proper positions relative to one another. This I accomplish by so constructing the sections 10, 10′ and 10″ that they are interlocking or self-retaining, that is to say, each section is constructed to hold in place the next adjacent one, the inner ring holding the intermediate one in place in this case, and the intermediate one in turn holding the outer one. In the construction shown, this is accomplished by simply tapering the adjacent edges of the sections 10, 10′ and 10″, the spaces 12 and 12′ referred to being formed by providing said sections with tapering peripheral walls, so as to permit each inner section to overlap the next adjacent outer section and prevent separation of said sections unless the retaining-ring 20 itself is removed. It will be noticed also that the spaces 12 and 12′ though narrow, are of sufficient width to permit each of the sections 10, 10′, and 10″ to turn freely without making contact with any other section, the only points of contact in the whole bearing being those at which the balls engage bearing surfaces at points in the surfaces of cones the vertices of which are in the common axis 6 of all the bearing members. Such a construction of retaining means is especially adapted for use in bearings of this type because, by reason of the angular positions of the respective sets of bearing surfaces 13′—13″, 14′—14″ and 15′—15″, as well as because of the angular positions of the corresponding sets of bearing surfaces 3′—3″, 4′—4″ and 5′—5″, all of the rows of balls are self-centering, and moreover, all of the sections of the upper bearing member are in like manner self-centering and always tend to run concentric with the axis 6 and out of contact with one another.

In a bearing of this type, that is, a multiple thrust bearing having all its rows of balls substantially in a common plane, the balls in different rows revolve at different speeds under ordinary conditions, that is to say, all the upper bearing surfaces move in unison, as is ordinarily the case. Under such circumstances the balls in the outer row revolve most rapidly and their tendency to fly outward under the action of centrifugal force is greater than is the case with respect to the balls in the intermediate row or circuit, which balls in turn revolve more rapidly and have greater tendency to fly outward, than the balls 9 of the inner row or circuit. In order to equalize the resistance opposed to such centrifugal action I prefer to make the bearing surfaces of the different sets, and particularly the outer bearing surfaces of such sets, both in the solid bearing member and in the sectional bearing member, of different pitches, the angle of the bearing surfaces of largest diameter to the horizontal being greater than the angle of the outer bearing surfaces of the intermediate set, the angle of which is in turn greater than the angle to the horizontal made by the outer bearing surfaces of the inner set. Moreover, these faces being preferably in all cases tangent to the respective points of contact of the balls therewith, permit the most favorable distribution of the load sustained by the walls. The greater the angle to the horizontal made by a bearing surface in contact with a ball, the greater the distance of the bearing point of the ball from its center measured in a horizontal direction, and hence the less the capacity of the ball for carrying loads. By referring to Fig. 2 it will be seen that the application of these principles to a bearing of this type is clearly illustrated, the different quadrilaterals, 25, 26 and 27, which are of different widths and heights illustrating the different distances from the centers of the balls, as measured in a horizontal direction, at which contact is made by the balls with bearing surfaces placed at different angles to the horizontal. From these quadrilaterals and the positions of the bearing surfaces themselves it will also be seen that the balls 9 of the innermost circuit sustain their loads nearer the vertical diameter thereof than do the balls 8 of the intermediate row; and that the balls 8 sustain their loads nearer their vertical diameters than do the balls 7 of the outermost row. This is necessary, because it is assumed that the total load borne by each section of the upper bearing member is substantially the same, and there is a larger number of balls in the intermediate row to sustain the total load borne by the intermediate section than in the innermost row; and in a corresponding manner there is a larger number of balls 7 in the outermost row to sustain the load borne by the outermost section than in the intermediate row. Thus each ball 7 has a lighter load to sustain than any ball 8; and each ball 8 has a lighter load to sustain than any ball 9. The tendency of the balls in the different rows to fly outward under action of centrifugal force however, varies according to the speed thereof, the balls in the outermost row having a greater speed naturally have a greater tendency to fly outward than the balls in the intermediate row, and the balls in the inner row having a less tendency to fly outward that the balls in the intermediate row, for which reasons the greatest angle to the horizontal is made by the ball surfaces 13″ and 3″. While the manner in which the loads borne by the different sets of balls are distributed may be varied and the relative angles of the bearing surfaces of the different concentric sets may also be varied, the construction just described is that which is most desirable for all high-speed bearings.

What I claim is:

1. The combination with a pair of complementary bearing members having a common axis and each of which has a plurality of substantially concentric bearing faces and one of which is formed in a single piece and the other divided into a plurality of relatively movable sections concentric with said axis and each containing one of said bearing faces, of a plurality of substantially concentric circuits of balls between and in contact with the bearing faces of said bearing members.

2. The combination with a pair of complementary bearing members having a common axis and each of which has a plurality of substantially concentric bearing faces and one of which is divided into a plurality of relatively movable sections concentric with said axis and each containing one of said bearing faces, of a plurality of substantially concentric circuits of balls between and in contact with the bearing faces of said bearing members, each bearing point of each ball being in the face of an imaginary cone having its vertex in said axis.

3. The combination with a pair of complementary bearing members having a common axis and each of which has a plurality of substantially concentric bearing faces lying at different depths and one of which is divided into a plurality of relatively movable sections concentric with said axis and each containing one of said bearing faces, of a plurality of substantially concentric circuits of balls between and in contact with the bearing faces of said bearing members.

4. The combination with a pair of complementary bearing members having a common axis and each of which has a plurality of substantially concentric grooves the walls of which provide bearing surfaces and one of which members is formed in a single piece and the other divided into a plurality of relatively movable sections concentric with said axis and each containing one of said grooves, of a plurality of substantially concentric circuits of balls between and lying in the grooves of said bearing members.

5. The combination with a pair of complementary bearing members having a common axis and each of which has a plurality of substantially concentric pairs of bearing faces and one of which is divided into a plurality of relatively movable sections concentric with said axis and each containing one of said pairs of bearing faces, of a plurality of substantially concentric circuits of balls between and in contact with the bearing faces of said bearing members, each point at which a ball makes contact with a bearing face being in the face of an imaginary cone having its vertex in said axis.

6. The combination with a pair of complementary bearing members having a common axis and each of which has a plurality of substantially concentric pairs of bearing faces lying at different depths and one of which bearing members is formed in a single piece and the other divided into a plurality of relatively movable sections concentric with said axis and each bearing member containing one of said pairs of bearing faces, of a plurality of substantially concentric circuits of balls between and in contact with the bearing faces of said bearing members.

7. The combination with a pair of complementary bearing members having a common axis and each of which has a plurality of substantially concentric pairs of bearing faces lying at different depths and one of which bearing members is divided into a plurality of relatively movable sections concentric with said axis and each bearing member containing one of said pairs of bearing faces, of a plurality of substantially concentric circuits of balls between and in contact with the bearing faces of said bearing members each point at which a ball makes contact with a bearing face being in the face of an imaginary cone having its vertex in said axis.

8. The combination with a pair of complementary bearing members having a common axis and each of which has a plurality of substantially concentric pairs of bearing faces and one of which bearing members is formed in a single piece and the other divided into a plurality of relatively movable sections concentric with said axis and each bearing member containing one of said pairs of bearing faces and all of said bearing members having their outer surfaces in a common plane, of a plurality of substantially concentric circuits of balls between and in contact with the bearing faces of said bearing members.

9. The combination with a pair of complementary bearing members having a common axis and each of which has a plurality of pairs of substantially concentric bearing faces positioned to make contact with balls of different circuits at successively increasing angles to the plane of rotation of the bearing from the axis toward the periphery thereof, of a plurality of substantially concentric circuits of balls between and in contact with the bearing faces of said bearing members.

10. The combination with a pair of complementary bearing members having a common axis and each of which has a plurality of pairs of substantially concentric bearing faces positioned to make contact with balls of different circuits at the outer sides of the ball-circuits and at successively increasing angles to the plane of rotation of the bearing from the axis toward the periphery thereof, of a plurality of substantially concentric circuits of balls between and in contact with the bearing faces of said bearing members.

11. The combination with a pair of complementary bearing members having a common axis and each of which has a plurality of substantially concentric bearing faces positioned to make contact with balls of different circuits at different angles to the axis of the bearing and one of which is divided into a plurality of relatively movable sections concentric with said axis and each containing one of said bearing faces, of a plurality of substantially concentric circuits of balls between and in contact with the bearing faces of said bearing members.

12. The combination with a pair of complementary bearing members having a common axis and each of which has a plurality of substantially concentric bearing faces positioned to make contact with balls of different circuits at successively increasing angles to the plane of rotation of the bearing from the axis toward the periphery thereof and one of which bearing members is divided into a plurality of relatively movable sections substantially concentric with said axis and each containing one of said bearing faces, of a plurality of concentric circuits of balls between and in contact with the bearing faces of said bearing members.

13. The combination with a pair of complementary bearing members having a common axis and each of which has a plurality of substantially concentric pairs of bearing faces positioned to make contact with balls of different circuits at different angles to the axis of the bearing and one of which is divided into a plurality of relatively movable sections concentric with said axis and each containing one of said bearing faces, of a plurality of substantially concentric circuits of balls between and in contact with the bearing faces of said bearing members.

14. A thrust bearing embodying a pair of complementary bearing members having a common axis and each of which has a plurality of pairs of substantially concentric sets of bearing faces, in combination with a plurality of substantially concentric circuits of balls between and in contact with the bearing faces of said bearing members, the bearing points of the balls on each bearing member being spaced at successively increasing intervals for different sets from the axis toward the periphery of the bearing.

15. A thrust bearing embodying a pair of complementary bearing members having a common axis and each of which has a plurality of substantially concentric sets of bearing faces and one of which is divided into a plurality of relatively movable sections concentric with said axis and each containing one set of said bearing faces, in combination with a plurality of substantially concentric circuits of balls between and in contact with the bearing faces of said bearing members, the bearing points of the balls on each bearing member being spaced at successively increasing intervals for different sets from the axis toward the periphery of the bearing.

16. The combination with a pair of complementary bearing members having a common axis and each of which has a plurality of substantially concentric bearing faces and one of which is divided into a plurality of relatively movable interlocking sections concentric with said axis, of a plurality of circuits of balls between and in contact with the bearing faces of said bearing members.

17. The combination with a pair of complementary bearing members having a common axis and each of which has a plurality of substantially concentric bearing faces and one of which is divided into a plurality of relatively movable interlocking sections concentric with said axis, of a plurality of circuits of balls between and in contact with the bearing faces of said bearing members, and a ball-retainer connecting one section of the sectional bearing member with the other bearing member.

18. The combination with a pair of complementary bearing members having a common axis and each of which has a plurality of substantially concentric bearing faces and one of which is divided into a plurality of relatively movable sections having tapered peripheries in overlapping interlocking relation with one another, of a plurality of circuits of balls between and in contact with the bearing faces of said bearing members.

19. The combination with a pair of complementary bearing members having a common axis and each of which has a plurality of substantially concentric bearing faces and one of which is divided into a plurality of relatively movable sections having tapered peripheries in overlapping interlocking relation with one another, of a plurality of circuits of balls between and in contact with the bearing faces of said bearing members, and a ball-retainer connecting one section of the sectional bearing member with the other bearing member and in overlapping interlocking relation with said section.

20. The combination with a plurality of bearing members each having a central opening, and a circuit of balls interposed between and in contact with said bearing members, of a retaining ring located within the central openings of said bearing members and coacting with the latter to prevent endwise separation of the same and being formed of different diameters with one end thereof in fixed connection with one of the bearing members and its other end clear of engagement with the opposite bearing member.

21. The combination with a pair of annular bearing members of like bore and each having an annular bearing face, and a circuit of balls interposed between and in contact with the bearing faces of said members, of a retaining ring located within the bores of said bearing members and being flared at its ends to coact with the latter to prevent endwise separation of the same, the said retaining ring being formed of different diameters with one part thereof in fixed connection with one of the bearing members and its other part clear of engagement with the opposite bearing member.

22. The combination with a pair of complementary bearing members having a common axis and each of which has a plurality of grooves having substantially concentric walls provided with ball bearing surfaces at different depths of the grooves such bearing surfaces located at successively increased distances from the bottoms of the grooves from the axis toward the periphery of the bearing members, and a plurality of substantially concentric circuits of balls arranged in said grooves.

Signed at Auburn in the county of Cayuga and State of New York this thirty-first day of March A. D. 1904.

HENRY LA CASSE.

Witnesses.
  E. M. JOHNSTON,
  A. W. MCALPINE.